US012762048B2

(12) United States Patent
Zlotnik

(10) Patent No.: US 12,762,048 B2
(45) Date of Patent: Oct. 13, 2026

(54) PREDICTIVE CENTER ALLOCATION DATA STRUCTURE

(71) Applicant: Micron Technology, Inc., Boise, ID (US)

(72) Inventor: Leon Zlotnik, Camino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/591,851

(22) Filed: Feb. 29, 2024

(65) Prior Publication Data

US 2024/0296118 A1 Sep. 5, 2024

Related U.S. Application Data

(60) Provisional application No. 63/449,663, filed on Mar. 3, 2023.

(51) Int. Cl.
*G06F 12/02* (2006.01)
*G06F 12/06* (2006.01)

(52) U.S. Cl.
CPC ...... *G06F 12/0246* (2013.01); *G06F 12/0653* (2013.01)

(58) Field of Classification Search
CPC ............. G06F 12/0246; G06F 12/0653; G06F 12/0223; G06F 2212/1008; G06F 2212/1016; G06F 12/0292; G06F 2212/1024; G06F 2212/7201; G06F 12/023; G06F 16/2282
See application file for complete search history.

(56) References Cited

U.S. PATENT DOCUMENTS

| | | | | |
|---|---|---|---|---|
| 7,895,216 | B2 | 2/2011 | Longshaw et al. | |
| 8,966,155 | B1 | 2/2015 | Mulligan | |
| 10,915,475 | B2 | 2/2021 | Dubey et al. | |
| 11,403,275 | B2 | 8/2022 | Yan et al. | |
| 11,934,704 | B1 * | 3/2024 | P | G06F 3/0631 |
| 2009/0259805 | A1 | 10/2009 | Kilzer et al. | |
| 2017/0286311 | A1 * | 10/2017 | Juenemann | G06F 12/10 |
| 2019/0114272 | A1 * | 4/2019 | Dubey | G06F 12/0246 |
| 2019/0258568 | A1 * | 8/2019 | Park | G06F 3/0659 |
| 2019/0258585 | A1 * | 8/2019 | Marcu | G06F 12/0246 |
| 2019/0349739 | A1 * | 11/2019 | Graham | G01S 5/12 |
| 2020/0012599 | A1 * | 1/2020 | Chiu | G06F 12/0246 |
| 2020/0097180 | A1 * | 3/2020 | Hironaka | G06F 3/0619 |
| 2022/0171706 | A1 * | 6/2022 | Cho | G06F 12/0292 |
| 2022/0245067 | A1 * | 8/2022 | Liu | G06F 12/1009 |
| 2024/0232093 | A1 * | 7/2024 | Lee | G06F 12/0246 |

* cited by examiner

*Primary Examiner* — Nanci N Wong
(74) *Attorney, Agent, or Firm* — Brooks, Cameron & Huebsch, PLLC

(57) ABSTRACT

An apparatus includes a memory resource configured to store data entries in data structures including a first data structure and a second data structure and a processing device coupled to the memory resources. The processing device is configured to determine a predicted address location in the first data structure for a data entry, determine an equivalent address location in the second data structure, and write the data entry to the equivalent address location in the second data structure.

20 Claims, 7 Drawing Sheets

PREDICTIVE CENTER ALLOCATION DATA STRUCTURE

PRIORITY INFORMATION

This application claims the benefit of U.S. Provisional Application No. 63/449,663, filed on Mar. 3, 2023, the contents of which are incorporated herein by reference.

TECHNICAL FIELD

Embodiments of the disclosure relate generally to digital logic circuits, and more specifically, relate to a predictive center allocation data structure.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
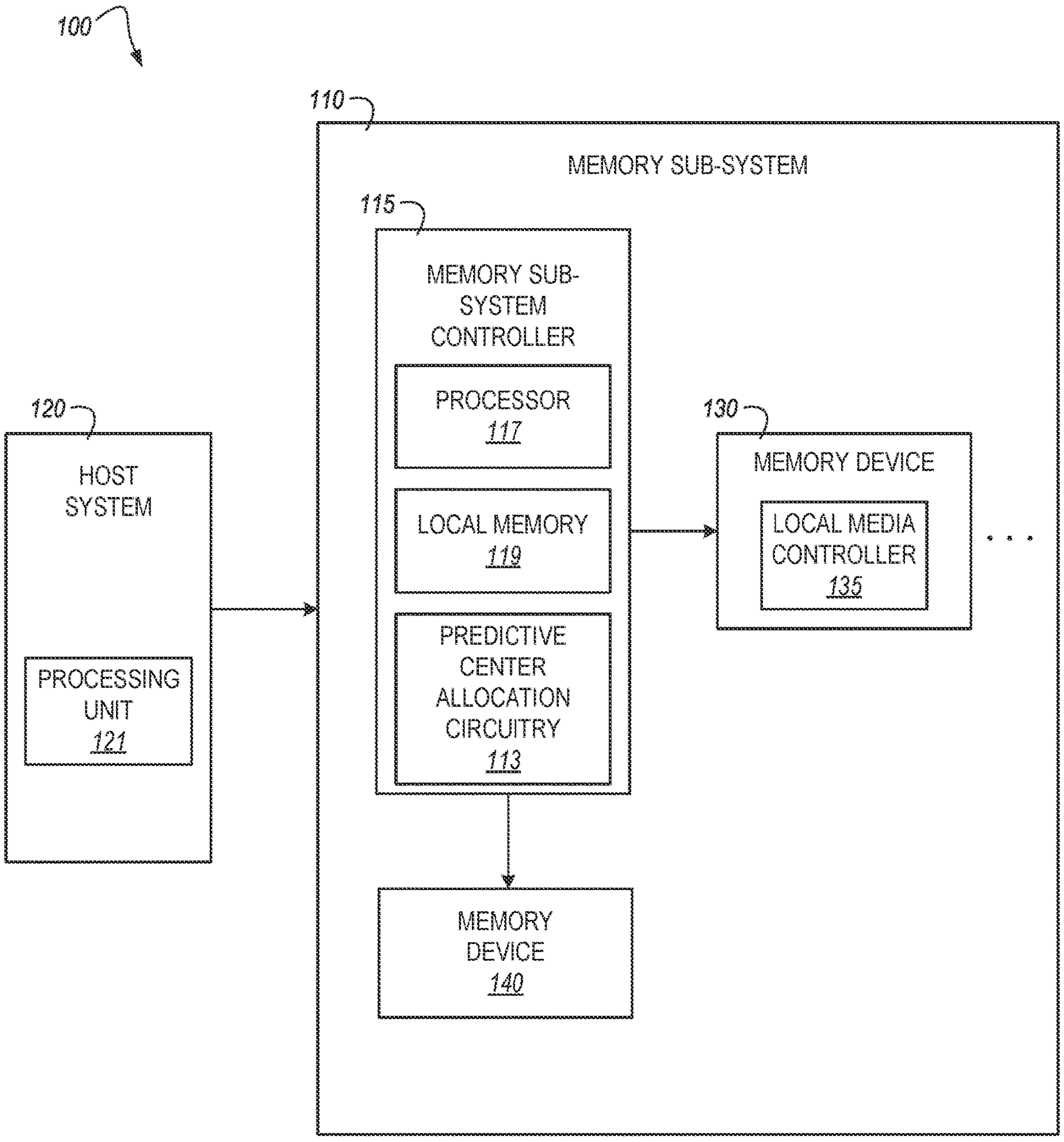
FIG. 1 illustrates an example computing system that includes a memory sub-system in accordance with some embodiments of the present disclosure.

Aspects of the present disclosure are directed to a predictive center allocation data structure and, in particular to memory sub-systems that include a predictive allocation data structure component which is also referred to as "predictive center allocation circuitry," herein. The predictive center allocation data structure can be stored within one or more memory resources that are associated with the memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

During operation, data is written to, and retrieved from the memory sub-system. Some data is written to persistent memory devices (which can be analogous to or similar to "non-volatile memory" devices) within the memory sub-system for long-term storage, while other data is written to non-persistent memory devices (which can be analogous to or similar to "volatile" memory devices) within the memory sub-system for quick, short-term retrieval. Still other data is written to various memory resources and/or caches of the memory sub-system to assist with performance of operations involving the memory sub-system. For example, various memory resources and/or caches can be utilized during operation of the memory sub-system to provide read caching, write-through caching, write-back caching, and/or write-around caching. In addition, some memory resources and/or caches of the memory sub-system can be allocated to store various tables that are utilized during operation of the memory sub-system. One such example is a logical-to-physical (L2P) table that is used to map logical addresses utilized by a host system to physical addresses of the memory sub-system where data is physically stored. Another such example is a database containing an organized collection of data that is stored within the memory resource and/or cache.

In some conventional approaches, when data is written to such memory resources and/or caches, the data is generally written sequentially (e.g., in an ascending or descending order) to physical addresses of the memory resource and/or cache in the order in which the data is received. For example, if a vector of data entries [51, 7, 300, 12, 3] is to be written to a memory resource and/or cache, a first data entry (51) is generally written to a first physical address (or "zeroth address location") of the memory resource and/or cache in the event that the data is ordered in an ascending manner. As used herein, a first data entry refers to an initial data entry that is written to a data structure prior to any subsequent data entries being written to the data structure.

When the second data entry (7) is written to the memory resource and/or cache, the first data entry (51) is shifted to a second physical address (or "first address location") of the memory resource and/or cache, and the second data entry (7) can be written to the first physical address (or "zeroth address location") of the memory resource and/or cache. When the third data entry (300) is written to the memory resource and/or cache, the first data entry (51) can be shifted to a third physical address (or "second address location") of the memory resource and/or cache, the second data entry (7) can be shifted to the second physical address (or "first address location") of the memory resource and/or cache, and the third data entry (300) can be written to the first physical address (or "zeroth address location") of the memory resource and/or cache. This pattern may be repeated for the remaining data entries (e.g., the fourth data entry (12) and the fifth data entry (3), in this particular example).

It is noted that the above example is utilized in approaches in which the data is not required to be ordered. In some conventional approaches in which the data is ordered as it is written to the memory resource and/or cache, the following example is illustrative. Considering the same vector of data entries [51, 7, 300, 12, 3], the first data entry (51) is generally written to a first physical address (or "zeroth address location") of the memory resource and/or cache. When the second data entry (7) is written to the memory resource and/or cache, the first data entry (51) can be shifted to a second physical address (or "first address location") of the memory resource and/or cache, and the second data entry (7) can be written to the first physical address (or "zeroth address location") of the memory resource and/or cache.

Continuing with this example, because the third data entry (300) is larger (e.g., has a greater numerical value) than the first data entry and the second data entry, the third data entry is written to the third physical address (or "second address location") of the memory resource and/or cache. Now, the fourth data entry (12) is less (e.g., has a lower numerical value) than the first data entry (51) and the third data entry (300) but is larger than the second data entry (7), the first data entry (51) and the third data entry (300) are shifted to a third physical address (or "second address location") and a fourth physical address (or "third address location"), respectively, and the fourth data entry (12) is written to the second physical address (or "first address location") of the memory resource and/or cache. Finally, because the fifth data entry (3) is less than the first through fourth data entries, each of the first data entry through the fourth data entry are shifted one address location up (e.g., the third data entry (300) is shifted to a fifth physical address (or "fourth address location"), the first data value (51) is shifted to the fourth physical address (or "third address location"), the fourth data value (12) is shifted to the third physical address (or "second address location"), and the second data value (7) is shifted to the second physical address (or "first address location). Finally, the fifth data value (3) is written to the first physical address (or "zeroth address location). Accordingly, a final order of the data entries in this approach is allocated such that the data entries are organized in an ascending order. It will be appreciated that the final order of the data entries in this approach can be organized in a descending order using similar operations to those described above.

As will be appreciated, the repeated shifts in the above examples require multiple reads, writes, overwrites, and rewrites of the data entries to maintain the data entries in a data structure within the memory resource(s) and/or cache (s), particularly when the data entries are maintained in an ordered (e.g., ascending or descending order based on the numerical values of the data entries) manner. These shifts and hence the reads and writes of the data entries can become costly in terms of computing resource overhead (e.g., power, time, bandwidth, etc.) and can therefore reduce the overall performance of a computing system in which such methodologies are employed.

Some other approaches attempt to address the above deficiencies by writing data (e.g., a first data entry) initially to a center address in a memory resource and/or cache. A center address refers to an address location in a data structure that is substantially physically equidistant from the first physical address of the memory resource and the last physical address of the memory resource. However, writing data initially to a center address can result in multiple reads, writes, overwrites, and rewrites of the data entries, particularly when the data entries are maintained in an ordered manner (e.g., ascending or descending order based on the numerical values of the data entries). That is, starting from a fixed point (e.g., the center address) in a data structure may not be suitable depending on a type and/or ordered manner of data entries to be stored in the data structure. For instance, data entries may be largely randomized or may have an ordered manner (e.g., an ascending or descending order). In such instances, writing a data entry initially to the center address can result in an undue quantity of subsequent shifts of the data entry (e.g., responsive to other data entries being written to the data structure). As mentioned, shifts (e.g., the reads and writes) of the data entries such as a data entry written initially to the center address can become costly in terms of computing resource overhead (e.g., power, time, bandwidth, etc.) and can therefore reduce the overall performance of a computing system in which such methodologies are employed.

To address the above and other deficiencies, approaches herein employ a predictive center allocation data structure. Approaches herein can use data entries in a full data structure (e.g., a first data structure) as a basis for determination of a predicted address location for a data entry to be written to a subsequent data structure (e.g., a new unfilled data structure). Notably, unlike the previous approaches, the predicted address location (and the equivalent address location) may be neither a first physical address nor a last physical address of a data structure. Further, unlike the previous approaches, the predicted address location (and the equivalent address location) can be an address location other than a center address of the data structure. Stated differently, the predictive center allocation data structure herein can permit a first data entry to be written to an off-center address location, as described herein. Accordingly, embodiments described herein, at least due to the determination of the predicted address location in at least a first data structure and subsequent writing of the data entry to an equivalent address location (e.g., which may be an off-center address location that is neither a first physical address a last physical address, nor a center address location) in a second data structure, can exhibit fewer shifts (e.g., reads and writes) of the data entries. As such, embodiments described herein can reduce computing resource overhead (e.g., power, time, bandwidth, etc.) and can therefore yield enhanced overall performance of a computing system in which such methodologies are employed.

In some embodiments, a predicted address location can be based on a plurality of predicted address locations in a plurality of full data structures. For instance, a predicted address location can be based on a predicted location in a first data structure and a predicted address location in at least one additional data structure. For example, the predicted address location can be located at a predicted location in the first data structure and the predicted address location in the at least one additional data structure when the predicted locations are the same (e.g., an equal distance from a first address location in the respective data structures). Alternatively, the predicted address location can be located at a mid-point between the predicted address locations when the predicted address locations are different (e.g., located at different respective distances from a first address location in the respective data structures). In any case, such embodiments which employ a plurality of data structures to predict the predicted address location may enhance the accuracy of the predicted address location and thereby can yield a further enhancement in the overall performance of the computing system in which such methodologies are employed.

In some embodiments, the predicted address location can be altered based on a quantity and/or direction of subsequent shifts experienced by a first data entry that was previously written to, and shifted within, a full data structure. That is, determination of a quantity and/or a direction of any previous shifts of the data entry in the full data structure can permit further enhancement of predicted address location. For instance, a base predicted address location (e.g., predicted based on data entries in at least one full data structure) can be altered based on a quantity and/or direction of the subsequent shifts of the first data entry in the at least one full data structure to a different address location in the at least one full data structure. For example, a base predicted address location can be shifted toward a first address location in a data structure responsive to determination that an earlier data entry (e.g., a first data entry) which was written to an address location in a respective full data structure underwent a quantity of subsequent shifts toward to the first address location in the respective full data structure, among other possibilities as detailed herein. Such embodiments may enhance the accuracy of the predicted address location and thereby can yield further enhancement in the overall performance of the computing system in which such methodologies are employed.

In the interest of clarity, embodiments herein will be generally described in relation to predicting an address location for a first (initial) data entry written to be written to a data structure. However, it will be appreciated that embodiments in which address locations of at least one additional data entry (e.g., a second data entry, a third data entry, etc.) which is to be written to the data structure are contemplated within the scope of the disclosure. Predicting at least one additional address location (in addition to the first data entry) can yield further enhancement in the overall performance of the computing system in which such methodologies are employed.

In the interest of clarity, embodiments herein will be generally described in relation to writing data to a predictive center allocation data structure in a memory resource, however, it will be appreciated that embodiments in which a cache is utilized are contemplated within the scope of the disclosure. As will be described in more detail herein, a predictive center allocation data structure is a data structure and/or technique for writing data to a data structure in which the first data entry is written to an address location in the memory resource that is neither a first physical address (e.g., a "zeroth address location") of the memory resource nor a last physical address (e.g., an $N^{th}$ address location, where N is the total quantity of address locations in the memory resource) of the memory resource. In some embodiments, the first data entry can be written to an address location other than an address location that is substantially physically equidistant from the first physical address of the memory resource and the last physical address of the memory resource. That is, in some embodiments, the first data entry can be written to an address location other than an address location that is in the middle of the memory resource with respect to the physical address spaces of the memory resource.

As used herein, the term "substantially" intends that the characteristic need not be absolute but is close enough so as to achieve the advantages of the characteristic. For example, "substantially equidistant" is not limited to a condition in which the address location that is substantially equidistant from the first physical address of the memory resource and the last physical address of the memory resource is absolutely equidistant from the first physical address of the memory resource and the last physical address of the memory resource but is equidistant from the first physical address of the memory resource and the last physical address of the memory resource within manufacturing limitations, operational conditions, etc. to achieve the characteristics of being "equidistant" from the first physical address of the memory resource and the last physical address of the memory resource. For example, if there are an even number of physical address locations in the memory resource, a physical address location that is substantially equidistant from the first physical address of the memory resource and the last physical address of the memory resource may not be at the exact physical center of the physical address locations but may be substantially equidistant such that components of the apparatus function as if said characteristics are the same or equal. It is further contemplated, however, that such characteristics may be exactly the same or exactly equal given the context of the disclosure.

In order to maintain an ordered (ascending) data structure in the memory resource, a second data entry can be written to an address location in the memory resource that is between the first physical address and the address at which the first data entry is written to if the second data entry has a value that is less than the value of the first data entry or the second data entry can be written to an address location in the memory resource that is between the last physical address and the address at which the first data entry is written to if the second data entry has a value that is greater than the value of the first data entry. It will be appreciated that, in order to maintain an ordered (descending) data structure in the memory resource, the second data entry can be written to an address location in the memory resource that is between the first physical address and the address at which the first data entry is written to if the second data entry has a value that is greater than the value of the first data entry or the second data entry can be written to an address location in the memory resource that is between the last physical address and the address and the address at which the first data entry is written to if the second data entry has a value that is less than the value of the first data entry.

Stated alternatively, and as described in more detail herein, when subsequent data entries have values that are less than the values of previous entries, they are, for an ordered ascending data structure, written to addresses that are closer to the first physical address location in the memory device. Conversely, when subsequent data entries have values that are greater than the values of previous entries, they are, for an ordered ascending data structure, written to addresses that are closer to the last physical address location in the memory device. For an ordered descending data structure, when subsequent data entries have values that are less than the values of previous entries, they are written to addresses that are closer to the last physical address location in the memory device and when subsequent data entries have values that are greater than the values of previous entries, they are written to addresses that are closer to the first physical address location in the memory device.

As described in more detail herein, as the data structure is filled with data entries, each subsequent data entry can be written to the data structure in an address location based on the relative value of each data entry with respect to the values of previously written data entries. This can allow for a quantity of shift operations (shifts) to keep the data structured in an ordered state to be reduced in comparison to the conventional approaches described above. Accordingly, by writing the data entries to the predictive center allocation data structure in accordance with the present disclosure, performance (e.g., the overall functioning) of a computing system in which embodiments of the present disclosure operate can be improved in comparison to the conventional approaches described above at least because the quantity of costly shift operations required to maintain the data entries in the data structure can be reduced in comparison to such approaches.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the computing system 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include predictive center allocation circuitry 113. Although not shown in FIG. 1 so as to not obfuscate the drawings, the predictive center allocation circuitry 113 can include various circuitry to facilitate aspects of the disclosure described herein. In some embodiments, the predictive center allocation circuitry 113 can include special purpose circuitry in the form of an ASIC, FPGA, state machine, hardware processing device, and/or other logic circuitry that can allow the predictive center allocation circuitry 113 to orchestrate and/or perform operations to write data (e.g., data entries) to a predictive center allocation data structure of a memory resource in accordance with the disclosure.

In some embodiments, the memory sub-system controller 115 includes at least a portion of the predictive center allocation circuitry 113. For example, the memory sub-system controller 115 can include a processor 117 (processing device) configured to execute instructions stored in local memory 119 for performing the operations described herein. In some embodiments, the predictive center allocation circuitry 113 is part of the host system 110, an application, or an operating system. The predictive center allocation circuitry 113 can be resident on the memory sub-system 110 and/or the memory sub-system controller 115. As used herein, the term "resident on" refers to something that is physically located on a particular component. For example, the predictive center allocation circuitry 113 being "resident on" the memory sub-system 110, for example, refers to a condition in which the hardware circuitry that comprises the predictive center allocation circuitry 113 is physically located on the memory sub-system 110. The term "resident on" may be used interchangeably with other terms such as "deployed on" or "located on," herein.

Figure 2:
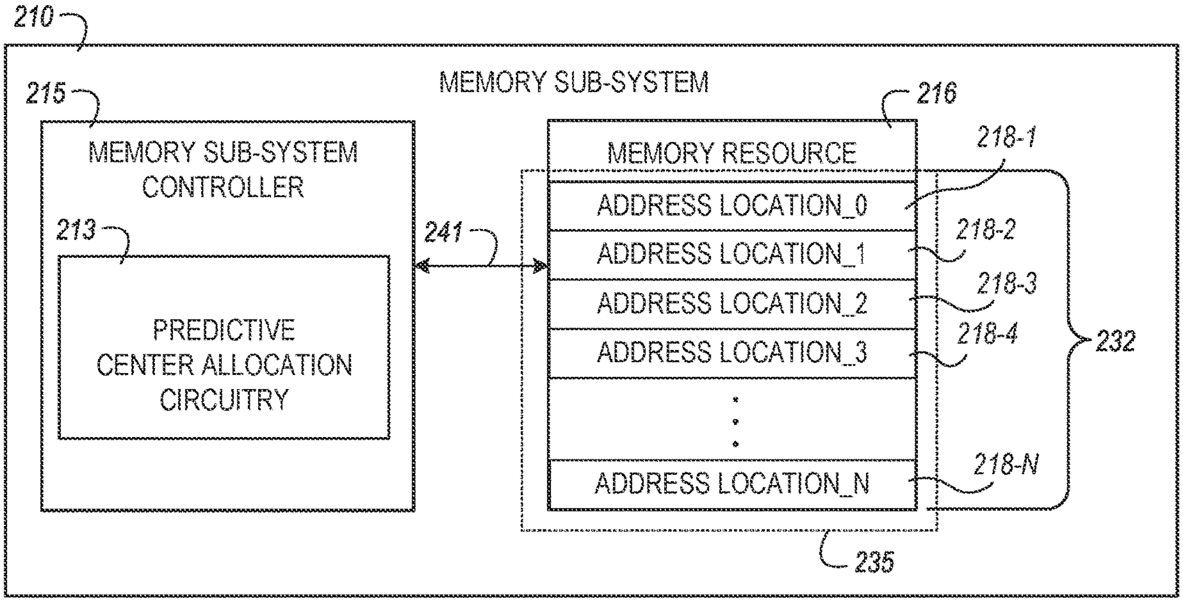
FIG. 2 illustrates an example memory sub-system in accordance with some embodiments of the present disclosure.

FIG. 2 illustrates an example memory sub-system 210 in accordance with some embodiments of the present disclosure. The example system, which can be referred to in the alternative as an "apparatus," includes a memory sub-system controller 215 and predictive center allocation circuitry 213 (referred to in the alternative as "control circuitry" 213), which can be analogous to the memory sub-system controller 115 and the predictive center allocation circuitry 113 illustrated in FIG. 1, herein. The memory sub-system 210 further includes a memory resource 216 that includes a plurality of address locations 218-1, 218-2, 218-3, 218-4 to 218-N (collectively referred to hereinafter as "address locations 218") that collectively form an address space 231 of the memory resource 216.

The address locations 218 can be physical address locations that correspond to one or more memory cells of the memory resource 216. In some embodiments, two hundred and fifty-six (256) address locations 218, five hundred and twelve (512) address locations 218, etc. can be provided within the memory resource 216. It will be appreciated, however, that the memory resource 216 can include greater than or less than these enumerated quantities of address locations based on the size, memory density, and/or architecture, among other factors of the memory resource 216 and/or the memory sub-system 210. In some embodiments, the address locations 218 are logically addressable, for example, by the host system 120 illustrated in FIG. 1, herein.

The address locations 218 can be configured to store data entries in a data structure 232 (e.g., a predictive center allocation data structure). As used herein, a "data structure" refers to a specialized format for organizing and/or storing data, which may or may not be organized in rows and columns. Examples of data structures include arrays, files, records, tables, trees, linked lists, hash tables, etc. In some embodiments, the data structure 232 can be configured to store a logical-to-physical (L2P) mapping table, although embodiments are not limited to this particular example.

The ADDRESS LOCATION_0 218-1 can be referred to as a "first physical address," a "zeroth address location," or a "lowermost physical location" of the memory resource 216, herein. The ADDRESS LOCATION_N 218-N can be referred to as a "last physical address," an "$N^{th}$ address location," or an "uppermost physical location" of the memory resource 216, herein.

As shown in FIG. 2, the memory resource 216 is resident on the memory sub-system 210. In the example of FIG. 2, the memory resource 216 can be resident on the memory sub-system 210 and not resident on any other component of the memory sub-system. Embodiments are not so limited and although not explicitly illustrated so as to not obfuscate the drawing layout, the memory resource 216 can be resident (or partially-resident) on any component of the memory sub-system 210. For example, the memory sub-system 210 can be resident on the memory sub-system controller 215, the control circuitry 213, the memory device 130, the local media controller 135, and/or the memory device 140 illustrated in FIG. 1.

In a non-limiting example, an apparatus (e.g., the memory sub-system 210) includes a memory resource 216 and a processing device (e.g., the predictive center allocation circuitry 213). The apparatus can be a system-on-chip, although embodiments are not so limited. As described herein, in some embodiments, the processing device can write a first data entry to an address location 218 of the memory resource 216 that is neither a first physical address 218-1 of the memory resource nor a last physical address 218-N of the memory resource 216. For instance, in some embodiments, the processing device is configured to write the first data entry to the address location 218 of the memory resource 216 that is neither the first physical address 218-1 of the memory resource 216 nor the last physical address 218-N of the memory resource 216 by writing the data entry to an address location 218 of the memory resource other than an address location that is substantially physically equidistant from the first physical address 218-1 of the memory resource 216 and the last physical address 218-N of the memory resource 216. As such, the approaches herein can realize a reduction in power consumption and/or an improvement in performance as compared to other approaches such as those that write a first data entry to an address location that is substantially physically equidistant from the first physical address 218-1 of the memory resource 216 and the last physical address 218-N of the memory resource 216 in all instances.

As described in more detail, herein, the memory resource 216 can include N address locations and (1) the first physical address 218-1 is a zeroth address location of the memory resource 216 and the last address location 218-N is an $N^{th}$ address location of the memory resource 216 or (2) the first physical address 218-1 is the $N^{th}$ address location of the memory resource 216 and the last address location 218-N is the zeroth address location of the memory resource 216. In addition, in some embodiments, the memory resource is configured to store the data entries in a data structure 232. In some embodiments, the data entries comprise logical-to-physical mapping entries associated with a memory sub-system 210 in which the memory resource 216 is deployed.

Figure 6:
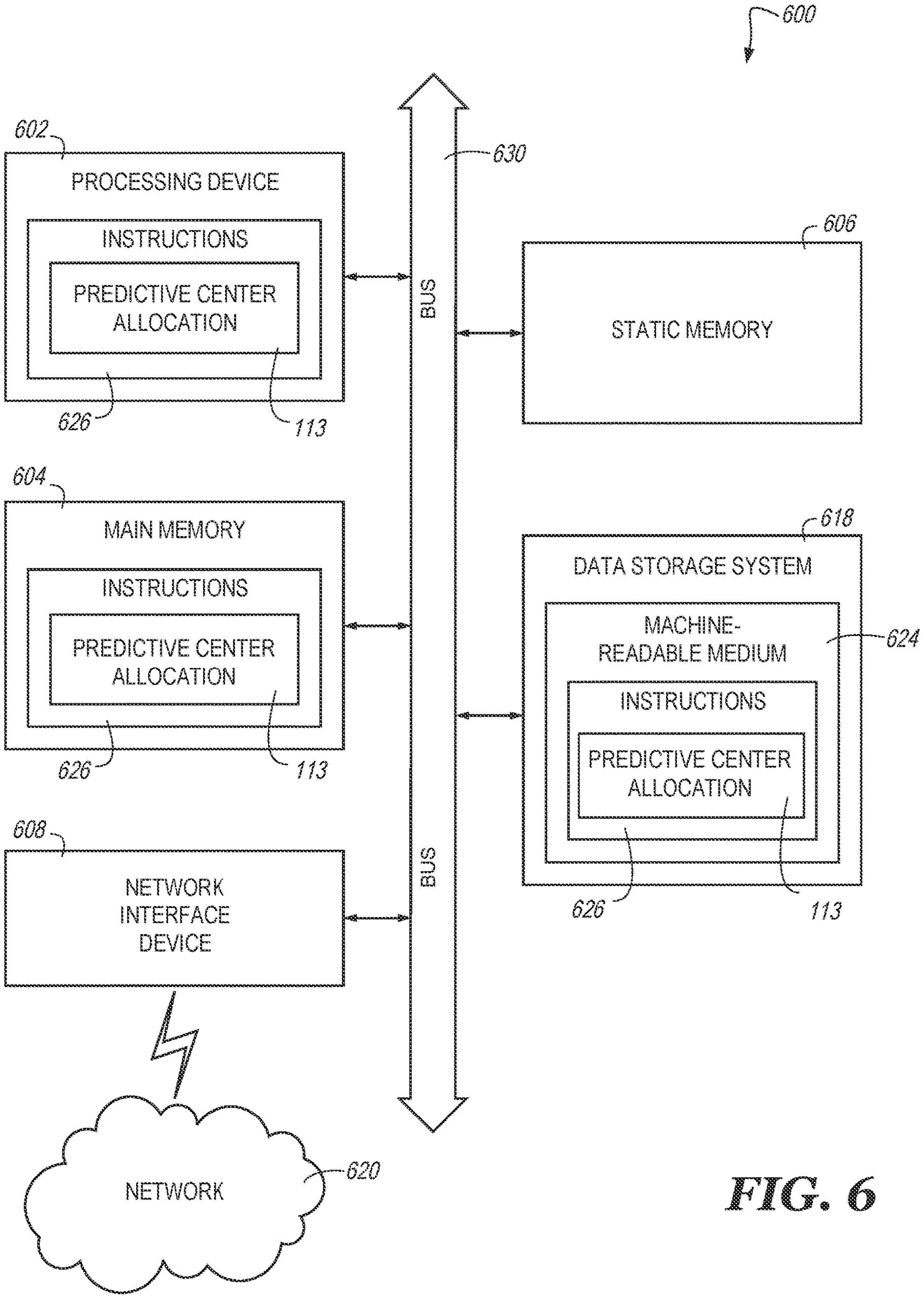
FIG. 6 is a block diagram of an example computer system in which embodiments of the present disclosure may operate.

In another non-limiting example, a non-transitory computer-readable storage medium (e.g., the machine-readable storage medium 624 illustrated in FIG. 6, herein) comprises instructions (e.g., the instructions 626 illustrated in FIG. 6, herein) that, when executed by a processing device (e.g., the predictive center allocation circuitry 213 and/or the processing device 602 illustrated in FIG. 6, herein), cause the processing device to write, to a memory resource 216 coupled to the processing device, a first data entry to an address location 218 other than an address location that is substantially equidistant between a first physical address 218-1 of the memory resource and a last physical address 218-N of the memory resource 216. Stated differently, the first data can be written to an off-center address location (e.g., an address location other than an address location that is substantially equidistant between a first physical address 218-1 of the memory resource and a last physical address 218-N of the memory resource 216, and yet is not the first physical address 218-1 nor the last physical address 218-N). As mentioned, writing the first data entry to an equivalent address location in a data structure as a predicted off-center address location in another data structure can reduce a quantity of subsequent shifts of the first data entry and thereby yield a reduction in power consumption and/or an improvement in performance of the memory resource 216.

The processing device can then (1) write, to the memory resource, a second data entry to an address location 218 that is physically located between the first physical address of the memory resource and the address location to which the first data entry is written when the second data entry has a value that is less than a value of the first data entry or (2) write, to the memory resource 216, the second data entry to an address location 218 that is physically located between the address location to which the first data entry is written and the last physical address of the memory resource 216 when the second data entry has a value that is greater than the value of the first data entry.

Continuing with this non-limiting example, the instructions can be further executed by the processing device to determine that the second data entry has the value that is less than the value of the first data entry and: (1) write, to the memory resource 216, a third data entry to an address location 218 that is physically located between the first physical address of the memory resource 216 and the address location to which the second data entry is written when the third data entry has a value that is less than the second data entry; (2) write, to the memory resource 216, the third data entry to an address location 218 that is physically located between the address location to which the first data entry is written and the address location to which the second data entry is written when the third data entry has a value that is greater than the second data entry but less than a value of the first data entry; or (3) write, the memory resource 216, the third data entry to an address location 218 that is physically located between the last physical address of the memory resource 216 and the address location to which the first data entry is written when the third data entry has a value that is greater than the first data entry.

Embodiments are not so limited, and in some embodiments, the instructions can be further executed by the processing device to determine that the second data entry has the value that is greater than the value of the first data entry and (1) write, to the memory resource 216, a third data entry to an address location 218 that is physically located between the address location to which the first data entry is written and the address location to which the second data entry is written when the third data entry has a value that is less than the second data entry and is greater than the first data entry; (2) write, to the memory resource 216, a third data entry to an address location 218 that is physically located between the address location to which the second data entry is written and the last physical address of the memory resource 216 when the third data entry has a value that is greater than the second data entry; or (3) write, to the memory resource 216, a third data entry to an address location 218 that is physically located between the address location to which the first data entry is written and the first physical address location when the third entry has a value that is less than the first data entry.

As described in more detail, herein the instructions can be further executed by the processing device to cause the processing device to write the first data entry, the second data entry, or one or more subsequent data entries, or any combination thereof, to the memory resource in a data structure 232. For example, the instructions can be further executed by the processing device to cause the processing device to write the first data entry, the second data entry, or one or more subsequent data entries, or any combination thereof, to the memory resource as part of an operation to write logical-physical mapping information associated with a memory sub-system 210 in which the memory resource 216 is deployed.

In some embodiments, the instructions can be further executed by the processing device to cause the processing device to receive a command to locate a particular data entry that has been written to the memory resource 216. In such examples, the particular data entry can be one of the first data entry, the second data entry, or a subsequently written data entry that is stored within the memory resource 216. The instructions can further be executed by the processing device to cause the processing device to perform a search such as a binary search involving each data entry that has been written to the memory resource 216 to locate the particular data entry.

Figure 3A:
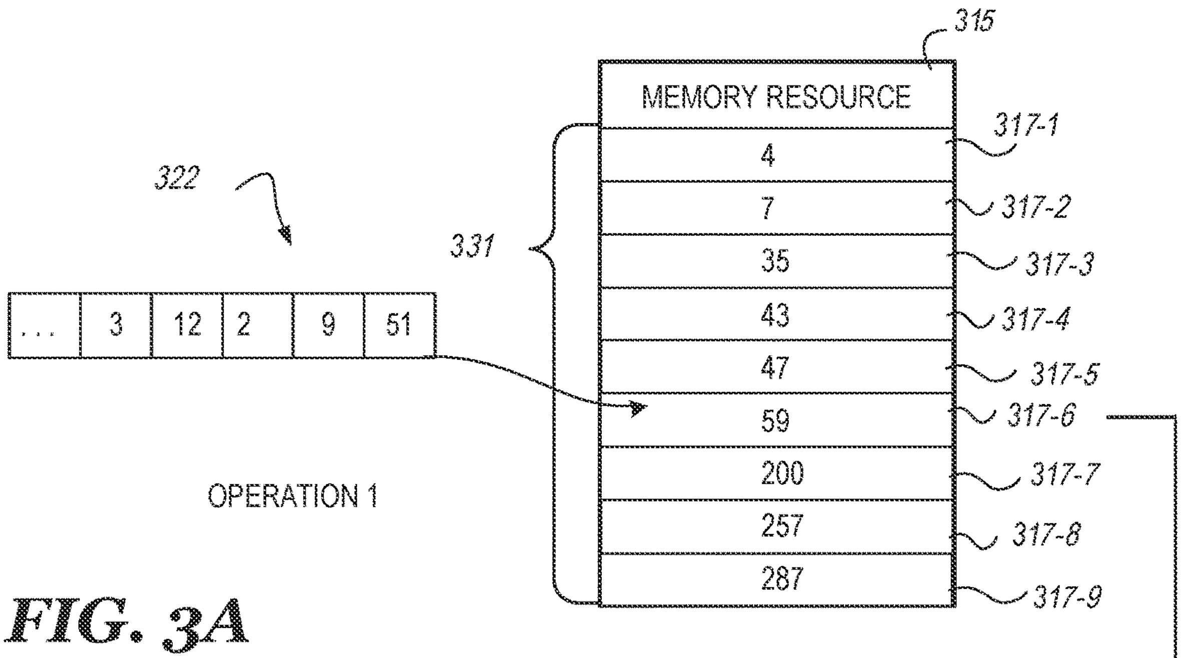
FIGS. 3A-3C illustrate an example of a series of operations that can be performed utilizing a predictive center allocation data structure in accordance with some embodiments of the present disclosure.
Figure 3B:
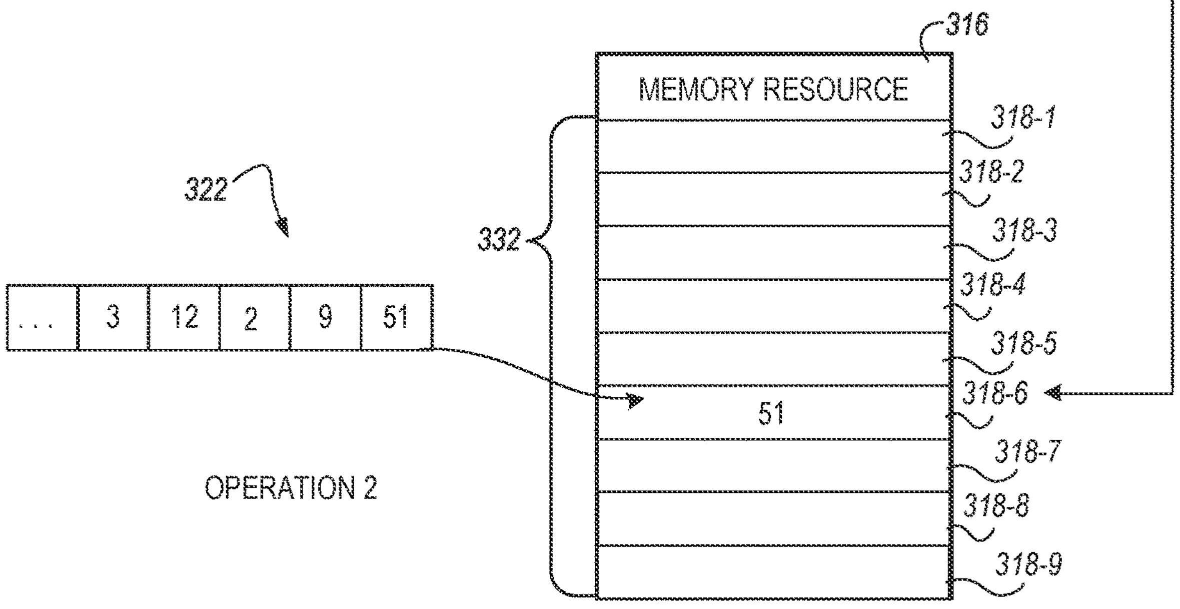
Figure 3C:
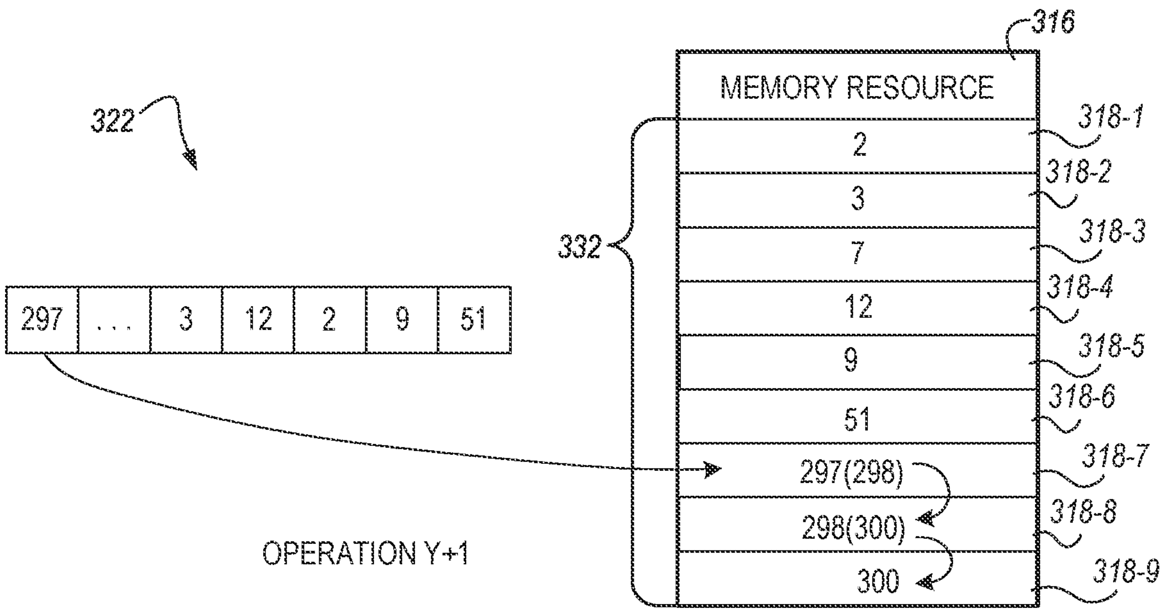

FIGS. 3A-3C illustrate an example of a series of operations that can be performed utilizing an example of a full data structure 331 and an example of a predictive center allocation data structure 332 in accordance with some embodiments of the present disclosure.

FIG. 3A illustrates an example of a full data structure 331. As used herein a full data structure refers to a data structure which has data entries written to each of the address locations in the data structure. For instance, a series (e.g., a vector) of data entries [4, 7, 35, 43, 47, 59, 200, 257, 287] have been previously written to each of the address locations 317-1, 317-2, 317-3, 317-4, 317-5, 317-6, 317-7, 317-8 to 317-9 of a memory resource 315. Thus, the memory resource 315 includes the full data structure 331. The full data structure 331 can be written with the same allocation mechanism or a different allocation mechanism. For instance, the full data structure 331 can be a predictive center allocation data structure written with a predictive center allocation mechanism, as described herein, or can be a different type of data structure such as a center allocation data structure, etc.

The memory resource 315 can be analogous to the memory resource 216 illustrated in FIG. 2, herein and the address locations 317 can be analogous to the address locations 218 illustrated in FIG. 2, herein. Accordingly, the address location 317-1 can be referred to as a "first physical address," a "zeroth address location," or a "lowermost physical location" of the memory resource 315, while the address location 317-9 can be referred to as a "last physical address," an "$N^{th}$ address location," or an "uppermost physical location" of the memory resource 315. In the example illustrated in FIG. 3A, the address location 317-5 represents an address location that is at the center of the address space (e.g., the address space 235 illustrated in FIG. 2, herein) and can be referred to as an address location of the memory device that is substantially physically equidistant from the first physical address 317-1 of the memory resource 315 and the last physical address 317-9 of the memory resource 315. The address locations 317-2, 317-3, 371-4, 317-6, 317-7, and 317-8 can be referred to as off-center address locations that are not the first physical address 317-1 of the memory resource 315, not the last physical address 317-9 of the memory resource 315, nor the center physical address 317-5.

In FIG. 3A, a first operation is performed to determine a predicted address location. For instance, the predicted address location can be determined for a first data entry [51] in a series 322 (e.g., a vector) of data entries [51, 9, 2, 12, 3] are written to address locations 318-1, 318-2, 318-3, 318-4, 318-5, 318-6, 318-7, 318-8 to 318-9 of a new data structure such as memory resource 316, as described herein. For instance, as illustrated in FIG. 3A, the first data entry [51] can be determined to be between a first data entry [47] in a first physical address (317-5) and a second data entry [59] in a second physical address (317-6) in the memory resource 315. Thus, the predicted address location can be determined to be an address location in a second data structure that is equivalent to a first physical address [317-5] of the first data structure to which a first prior data entry [47] is written or a second physical address [317-6] of the first data structure to which a second prior data entry [59] is written. Thus, if an additional physical address were available in the memory resource 315 the first data entry [51] could be written to the additional physical address and one or more data entries (e.g., the second data entry [59]) could be shifted within the memory resource 315 accordingly. Accordingly, the physical address at which the first data entry [51] would be written to the memory resource 315 can be determined to be the predicted address location in the memory resource 315. For example, the predicted address location can be determined to be an address location in a second data structure that is equivalent to a first physical address of the first data structure to which a first prior data entry is written or a second physical address of the first data structure to which a second prior data entry is written. For instance, the predicted address location can be equivalent to the first address location when the value of the data entry is equal to the value of the data entry in the first address location or can be equivalent to the second address location when the value of the data entry is equal to the value of the data entry in the second address location. Alternatively, the data value associated with the predicted address location can be between the value of the data entry written to the first address location in the first data structure and the value of the data entry written to the second address location in the first data structure and either an equivalent address to the first address location or the second address location can be determined as described herein.

Notably, in some embodiments, the predicted address location can be an off-center address location (e.g., the physical address (317-6)). As mentioned, having the predicted address location be an off-center physical address location can yield reduce computing resource overhead (e.g., power, time, bandwidth, etc.) and can therefore yield enhanced overall performance of a computing system in which such methodologies are employed.

In some embodiments, the off-center address location can be an off-center address location that is most proximate to the center address location (317-5) of the first address location and the second address location (e.g., when the data value to be written is a value between a data value written to the first address location and a data value written to the second address location). For instance, if a predicted address location is located between the physical address location 317-6 (the first address location) and the physical address location 317-7 (the second address location) the physical address location 317-6 can be determined to be the predicted address location due to the physical address location 317-6 being off-center and being more proximate to the center address location. Thus, the predicted address location can be an off-center address location that is relatively proximate to the center address (317-5) and thus provides benefits associated with center address allocation and yet accounts for the previously written data (e.g., written to the prior full address structure) to mitigate any subsequent shifts of the initial data entry written to an equivalent address in another data structure.

The first operation (as well as the subsequent operations described in connection with FIGS. 3B-3C) can be controlled by a processing device (e.g., the predictive center allocation circuitry 113/213 illustrated in FIG. 1 and FIG. 2, herein and/or the processor 117 illustrated in FIG. 1, herein). The first data entry (51) is written to an address location (e.g., the address location 317-6) of the memory resource 315 that is not a first physical address (e.g., the address location 317-1) of the memory resource 315, not a last physical address (e.g., the address location 317-9) of the memory resource 315, nor a center physical address (e.g., the address location 317-5) of the memory resource.

In the non-limiting example illustrated in FIGS. 3B-3C, a series 322 (e.g., a vector) of data entries [51, 9, 2, 12, 3, etc.] are written to address locations 318-1, 318-2, 318-3, 318-4, 318-5, 318-6, 318-7, 318-8 to 318-9 of a memory resource 316. In the non-limiting example illustrated in FIGS. 3A-3C, the data entries are organized in the full data structure 331 and the data entries organized in the predictive center allocation data structure 332 such that the data entries are ordered in an ascending order from data entries that have a lowest numerical value to data entries that have a highest numerical value (e.g., data entries having lower numerical data values than previously written data entries are written to address locations that are closer to the first physical address while data entries having higher numerical data values than previously written data entries are generally written to address locations that are closer to the last physical address). It will however be appreciated that embodiments are contemplated in which the data entries are organized in the predictive center allocation data structure 332 such that the data entries are ordered in a descending order from data entries that have a highest numerical value to data entries that have a lowest numerical value. It will further be appreciated that the non-limiting example shown in FIGS. 3A-3C is merely illustrative and is provided to clarify operations that can be performed using the predictive center allocation data structure of the present disclosure. Accordingly, embodiments are not limited to the particular non-limiting example illustrated in FIGS. 3A-3C.

The memory resource 316 can be analogous to the memory resource 216 illustrated in FIG. 2, herein and the address locations 318 can be analogous to the address locations 218 illustrated in FIG. 2, herein. Accordingly, the address location 318-1 can be referred to as a "first physical address," a "zeroth address location," or a "lowermost physical location" of the memory resource 316, while the address location 318-9 can be referred to as a "last physical address," an "$N^{th}$ address location," or an "uppermost physical location" of the memory resource 316. In the example illustrated in FIGS. 3A-3C, the address location 318-5 represents an address location that is at the center of the address space (e.g., the address space 235 illustrated in FIG. 2, herein) and can be referred to as an address location of the memory device that is substantially physically equidistant from the first physical address 318-1 of the memory resource 316 and the last physical address 318-9 of the memory resource 316.

In some embodiments, the predicted address location can be altered based on a quantity, a direction, or both, of shifts in a first data entry written to a full data structure. For instance, the predicted address location (e.g., 317-6) can altered based on a quantity, a direction, or both, of shifts in a first data entry written to the memory resource 315 (a first data structure). If the first data entry written to the memory resource 315 was subsequently shifted (e.g., up, down, etc.) responsive to subsequent data entries being written to the memory resource this may indicate that a location of the predicted address location should be located elsewhere in the memory resource 315. As mentioned, reduction of a quantity of data shifts can improve performance and thus altering the predicted address location based on a quantity, a direction, or both, of shifts in a first data entry written to a full data structure may reduce a quantity of data shifts in the new data structure to which the first data entry is to be written. For example, a first data entry written to the memory resource 315 that was subsequently shifted (e.g., one shift of one physical address) toward the last physical address in the memory resource 315 may indicate that the altered predicted address location should be further altered (e.g., from 317-6 as illustrated in FIG. 3A) to another address (e.g., 317-7) that is in closer in physical proximity to the last physical address (e.g., 317-9) in the memory resource 315 and thus mitigate any subsequent shifts of the first data entry once written to the memory resource 316. Stated differently, the altered predicted address location (and thus the equivalent address location) can be shifted in the same direction as a quantity of shifts incurred by a first data value previously written to a full data structure.

In FIG. 3B, an equivalent address can be determined and a second operation is performed to write the first data entry (51) to the equivalent memory resource 316. The equivalent address location can be the same distance from a first address location, the last address location, and/or the center address location in the new data structure as the predicted address location is in the full data structure. For instance, the predicted address location (317-6) in the memory resource 315 can be a first distance from each of the first address location, the last address location, and the center address location in the memory resource 315 that is the same as a second distance from the equivalent address to each of first address location, the last address location, and the center address location in the memory resource 316. For example, the predicted address location (317-6) is located one physical address location below the center address (317-5) in the memory resource 315 and the equivalent address location (318-6) is also located one physical address below the center physical address (318-5) in the memory resource 316.

Determination of the predicted address location, determination of the equivalent address location, and the first operation (as well as the subsequent operations such as those described in connection with FIGS. 3A-3C) can be controlled by a processing device (e.g., the predictive center allocation circuitry 113/213 illustrated in FIG. 1 and FIG. 2, herein and/or the processor 117 illustrated in FIG. 1, herein). The first data entry (51) is written to an address location (e.g., the address location 318-6) of the memory resource 316 that is neither a first physical address (e.g., the address location 318-1) of the memory resource 316 nor a last physical address (e.g., the address location 318-9) of the memory resource 316.

FIG. 3C illustrates the series 322 (e.g., a vector) of data entries [51, 9, 2, 12, 3, etc.] that have been written to address locations 318 of a memory resource 316 in various operations subsequent to the second operation described in FIG. 3B. For instance, a third operation can be performed to write the second data entry (9) in the series 322, which has a lower numerical value than the first data entry (51), to the memory resource 316 at the physical address location 318-5. Similarly, each of the other data entries [51, 9, 2, 12, 3, 7, 298, 300, 297] can be written to respective physical address locations in the memory resource 316. In some embodiments subsequent operations can write data entries at respective physical address locations that are adjacent to an data entry written to the data structure. Stated differently, in some embodiments, the second entry can be written to an address location that is immediately next to (e.g., the address location 318-5) the address location (e.g., the address location 318-6) to which the first data entry is written. However, in some embodiments, the subsequent data entries can be written to a physical address location that is spaced at least one physical address location apart from a physical address location at which a previous data entry is written.

FIG. 3C illustrates the memory resource 316 and predictive center allocation data structure 332 at a point in time after a $Y^{th}$ operation has been performed to write data entries (51, 9, 2, 12, 3, 7, 298, 300, 297) to the memory resource 316. As shown in FIG. 3C, a $Y^{th}$+1 operation is performed to write a data entry (297) to the memory resource 316. In order to write the data entry (297) to the memory resource 316 while maintaining the predictive center allocation data structure 332 in an ordered manner, a batch shift operation involving the data entry (300) and the data entry (298) is performed to shift the data entry (300) from the address location 318-8 to the address location 318-9 and to shift the data entry (298) from the address location 318-7 to the address location 318-8. The process of shifting data entries to open an address space (318-7) for a subsequent data entry having a numerical value that lies between a group of data entries that are written to sequential address locations in the memory resource 316 is referred to herein as a "batch shift operation" or a "batch shift" for brevity. This batch shift operation opens the address location 318-7, and, as shown in FIG. 3C, the data entry (297) is written to the address location 318-7, thereby maintaining the ordered nature of the predictive center allocation data structure 332.

Although not explicitly shown in FIGS. 3A-3C, if a data entry that has a higher (or lower) value than the largest (or smallest) data entry written to the data structure 332, the contents of the data structure 332 can be shifted accordingly to free up an address location to write the data entry to. For example, if, a subsequent data entry arrives that has a lower value than any of the data entries in the data structure 332 (e.g., a data entry with a value of (1)), the contents of the data structure 332 can be shifted toward the last physical address 318-9 to allow for the data entry (1) to be written to the data structure 332. It will be appreciated that similar operations can be performed in the event that a data entry has a value that is higher than the other data values in the data structure 332 is received when data values are written to the last physical location of the data structure 332.

One of the main advantages of maintaining the ordered nature of the predictive center allocation data structure 332 is to allow for utilization of binary searching (which is also referred to as logarithmic searching) in order to locate specific data entries within the predictive center allocation data structure 332. As will be appreciated, binary searching is a technique in which a search interval used to search for particular entries in a sorted (e.g., ordered) data structure is repeatedly divided in half. This technique allows for minimization of search queries in an ordered data structure as the search interval generally converges rapidly to locate the particular data entry.

Figure 4:
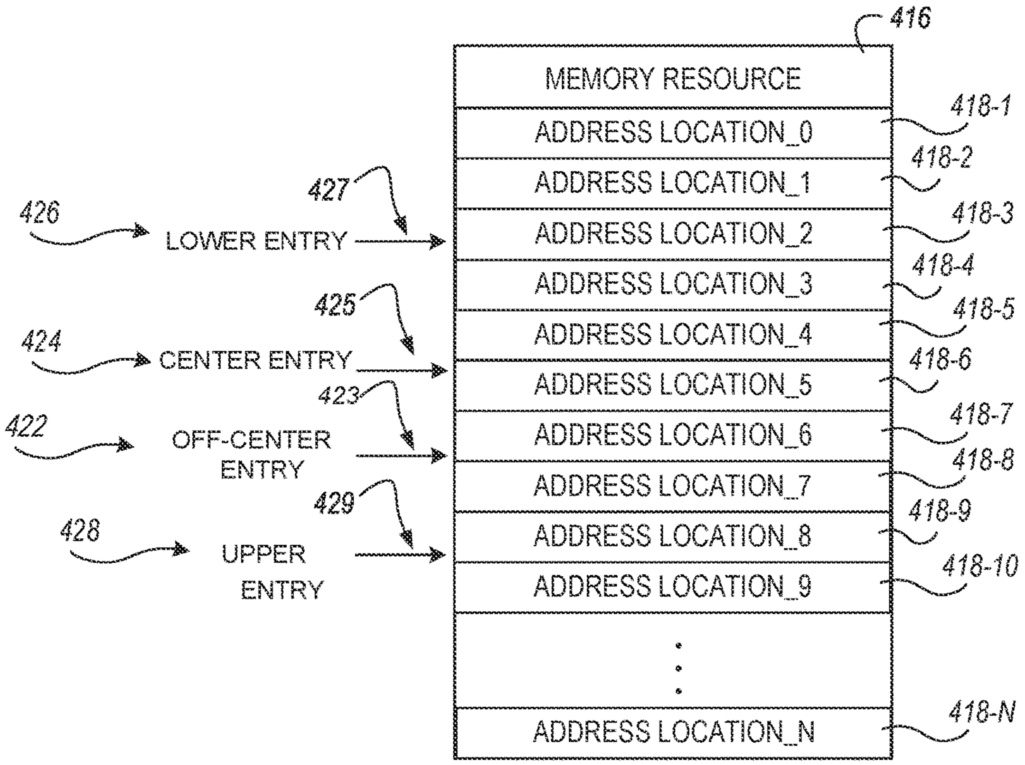
FIG. 4 illustrates an example of a memory resource having a plurality of address locations in accordance with some embodiments of the present disclosure.

FIG. 4 illustrates an example of a memory resource 416 having a plurality of address locations 418-1 to 418-N in accordance with some embodiments of the present disclosure. The memory resource 416 can be analogous to the memory resource 216/316 illustrated in FIG. 2 and FIGS. 3A-3C, herein, and the address locations can be analogous to the address locations 218/318 illustrated in FIG. 2 and FIGS. 3A-3C, herein. In FIG. 4, an off-center entry 422, a center entry 424, a lower entry 426, and an upper entry 428, are illustrated. Each of these entries corresponds to a data entry that has been written to the memory resource 416 and has a respective pointer 423, 425, 427, and 429 associated therewith.

The off-center entry 422 can correspond to a first data entry that is written to the memory resource 416, e.g., a data entry that is written to an address location, in this case the address location 418-6, that is not a first physical address 418-1, not a last physical address 418-N, nor a center entry 424. The pointer 423 can be assigned to this address location to indicate where the off-center data entry is written in the memory resource 416. In some embodiments, the equivalent address location can be an off-center address location to which data such as the off-center entry 422 can be written to the memory resource 416.

However, in some embodiments, the equivalent location can be another location to which data is written such as the center entry 424, the first physical address 418-1, or the last physical address 418-N. For instance, when a data value to be written to a data structure is less than or greater than any data values in a prior data structure (a prior full data structure) the equivalent location can be determined to be a default location such as the center entry 424, the first physical address 418-1, or the last physical address 418-N.

The center entry 424 can correspond to a first data entry that is written to the memory resource 416, e.g., a data entry that is written to an address location, in this case the address location 418-6, that is equidistant from a first physical address 418-1 and a last physical address 418-N. The pointer 425 can be assigned to this address location to indicate where the center data entry is written in the memory resource 416.

The lower pointer 427 can be assigned to an address location in which the lower entry 426, e.g., the data entry that, for an ordered ascending data structure (e.g., the data structure 232 illustrated in FIG. 2, the full data structure 331, and/or the predictive center allocation data structure 332, as described herein) has a lowest value and is therefore physically closest to the first physical address 418-1, is written. Similarly, the upper pointer 429 can be assigned to an address location in which the upper entry 428, e.g., the data entry that, for an ordered ascending data structure has a highest value and is therefore physically closest to the last physical address 418-N, is written.

The pointers 423, 425, 427, and 429 can be dynamically moved as the memory resource is filled with data entries. For example, the pointer 425 can be moved to align with the center entry 424 (e.g., with the data entry that is equidistant from the lower entry 426 and the upper entry 428), while the lower pointer 427 and the upper pointer 429 can, for an ordered ascending data structure, be moved to align with the data entry that has the lowest numerical value and the data entry that has the highest numerical value, respectively. It will be appreciated that, for an ordered descending data structure, the lower pointer 427 and the upper pointer 429 can be moved to align with the data entry that has the lowest numerical value and the data entry that has the highest numerical value, respectively.

The pointers 423, 425, 427, and 429 can be used in connection with determining an address location 418 in the data structure to write data entries. For example, the pointer 427 can be checked to determine a numerical value of a data entry written to the address location associated with the lower entry 426 to determine if a data entry that is to be written to the memory resource 416 has a greater numerical value or a lesser numerical value than the value of the data entry written to the address location associated with the lower entry 426. If the numerical value of the data entry that is to be written to the memory resource 416 is less than the numerical value of the data entry written to the address location associated with the lower entry 426, the data entry that is to be written to the memory resource 416 can be written to an address location that is physically closer to the first physical address of the memory resource (for an ordered ascending data structure) and the pointer 427 can be moved to point to the newly written data entry.

Similarly, the pointer 429 can be checked to determine a numerical value of a data entry written to the address location associated with the upper entry 428 to determine if a data entry that is to be written to the memory resource 416 has a greater numerical value or a lesser numerical value than the value of the data entry written to the address location associated with the upper entry 428. If the numerical value of the data entry that is to be written to the memory resource 416 is greater than the numerical value of the data entry written to the address location associated with the upper entry 428, the data entry that is to be written to the memory resource 416 can be written to an address location that is physically closer to the last physical address of the memory resource (for an ordered ascending data structure) and the pointer 429 can be moved to point to the newly written data entry.

Figure 5:
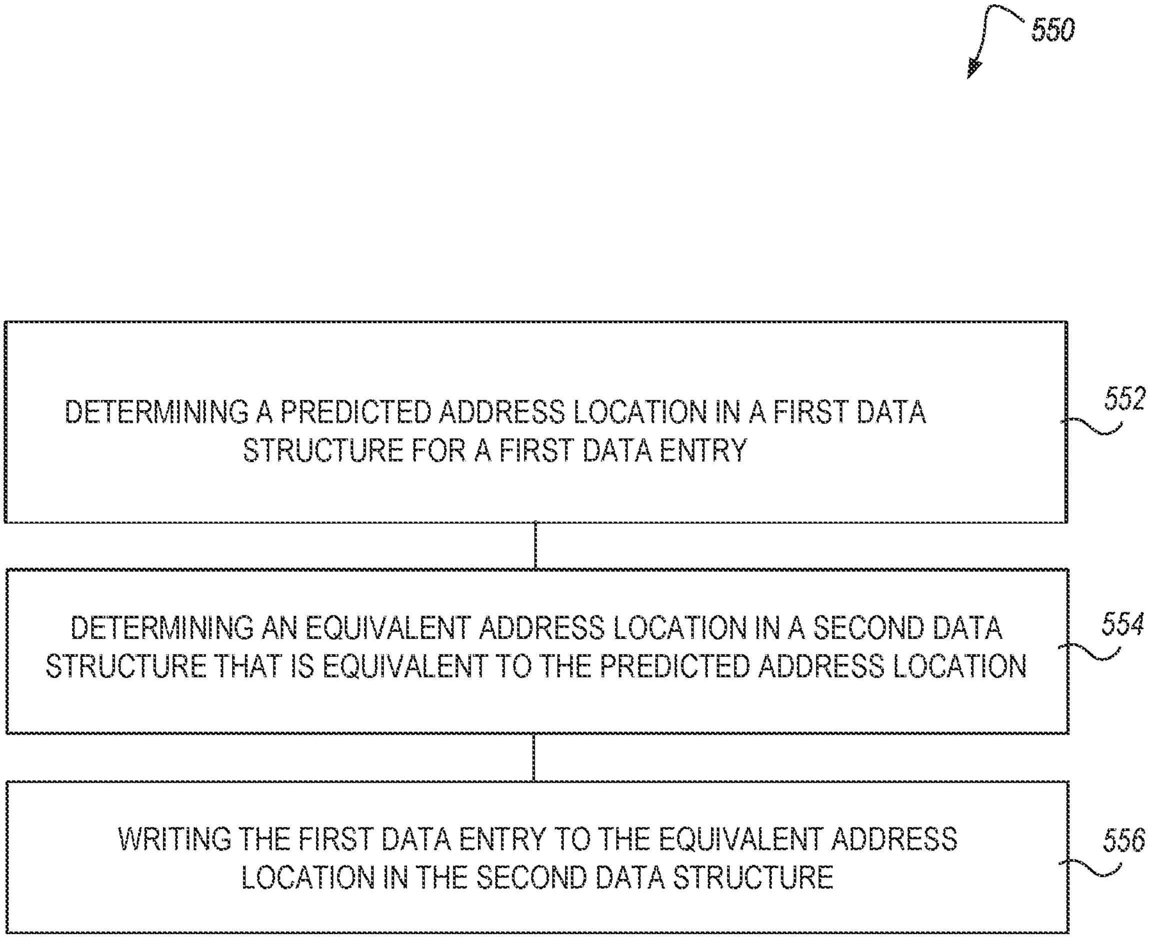
FIG. 5 is a flow diagram corresponding to a method for a predictive center allocation data structure in accordance with some embodiments of the present disclosure.

FIG. 5 is a flow diagram corresponding to a method 550 for a predictive center allocation data structure in accordance with some embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the predictive center allocation circuitry 113 of FIG. 1 and/or the predictive center allocation circuitry 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 552, the method 550 includes determining a predicted address location in a data structure for a data entry. The predicted address location can be determined based on at least one full data structure (a previously filled data structure), as described herein. As mentioned, the predicted address location may be neither the first physical address of the data structure nor the last physical address of the data structure. In some embodiments, the predicted address location may be neither the first physical address of the data structure, nor the last physical address of the data structure, nor an address location that is substantially equidistant from the first physical location of the data structure and the last physical location of the data structure. Thus, the predicted address location can be an off-center address location (e.g., the off-center address location 418-7 as illustrated in FIG. 4). As used herein, an off-center address location refers to an address location in a data structure that that is neither the first physical address of the data structure, nor the last physical address of the data structure, nor an address location that is substantially equidistant from the first physical location of the data structure and the last physical location of the data structure.

In some embodiments, the predicted address location can be based on an individual full data structure such as the data structure 331 in FIG. 3A. Predicted address locations determined based on an individual full data structure can be readily determined with a relatively small amount of delay, small amount of computational burden, and/or a small amount of power consumption.

In some embodiments, the full data structure can be a data structure that is directly preceding the second data structure (a most recently filled individual data structure) of a plurality of full data structures. Stated differently, the full data structure can be an immediately preceding data structure that was most recently filled.

However, in some embodiments the data structure can be a different individual data structure included in a plurality of filled data structures such as an oldest data structure (a first data structure that is filled) of the plurality of filled data structures. For instance, a predicted address location can be determined in a first data structure (a full first data structure) as an address location that is located between a first physical address of the first data structure to which a first prior data entry is written and a second physical address of the first data structure to which a second prior data entry is written. That is, a data value (a new data value) to be written to a data structure (a new unfilled data structure) can be compared to the data values written in a full data structure to determine where in the full data structure the data value would be written if another open address location where available in the full data structure. Thus, the address location in the full data structure would be written, if another address location was available in the full data structure, can be determined to be the predicted address location.

However, in some embodiments, the predicted address location can be determined based on a plurality of full (previously filled) data structures. Predicted address locations determined based on a plurality of full data structures can have enhanced accuracy and therefore may yield further enhancements in subsequent power consumption reduction and/or computational burden reduction. As mentioned, the data structures herein can have the same quantity of address locations and/or can have the respective data stored therein configured (e.g., in an ascending order, in a descending order, etc.) in the same manner. In some embodiments, each of the full data structures can have the same quantity of address locations and can have the respective data stored therein configured in the same manner. Thus, an average of predicted address locations in a plurality of full data structures can be readily determined. Similarly, the new data structure (to which a first data entry is to be written) can have the same quantity of address locations and can have the respective data stored therein configured in the same manner as the full data structures. For instance, the new data structure (to which a first data entry is to be written) can have the same quantity of address locations and can have the respective data stored therein configured in the same manner as the full data structures.

In some embodiments, the predicted address location can be equal to an average address location that is an average of respective address locations in two or more full data structures which each have the same quantity of address locations, but store different data. For example, a first predicted address location can be determined for the first full data structure (having a total of "N" address locations). For instance, the first data structure (the first full data structure) can include N address locations, where a first physical address is a zeroth address location of the first data structure and a last address location is an $N^{th}$ address location of the first data structure, or where the first physical address is the $N^{th}$ address location of the first data structure and the last address location is the zeroth address location of the first data structure. Similarly, a second predicted address location can be determined for an additional full data structure (which also has a total of "N" address locations but includes different data relative to the first data structure). For instance, the second data structure (the second full data structure) can include N address locations, where a first physical address is a zeroth address location of the second data structure and the last address location is an $N^{th}$ address location of the second data structure, or where the first physical address is the $N^{th}$ address location of the second data structure and the last address location is the zeroth address location of the second data structure. In such embodiments, a quantity of the N address locations in the first data structure can be equal to a quantity of the N address locations in the second data structure.

As mentioned, a first predicted address location and a second predicted address location can be determined. In some embodiments, the first predicted address location, the second predicted address location, or both, can be an off-center address location. An average of the predicted address location in the first full data structure and the predicted address location in the additional full data structure can be determined to be an average address location. The average address can be equidistant from the predicted address location in the first full data structure and the predicted address location in the additional full data structure. The average address location can be designated as the predicted address location. However, other mechanisms for determination of the predicted address location are possible. For instance, the predicted address location can be a weighted average, RMS, etc. of the predicted address location in the first full data structure and the predicted address location in the additional full data structure. Thus, in some embodiments a predicted address location in a given data structure can be afforded a different weight than a weight afforded to a predicted address location in a different data structure. For instance, in some embodiments, the predicted location can be based on predicted location in a first data structure that is an immediately preceding data structure that was most recently filled and a predicted location in at least one additional data structure. In such instances, a weight associated with the predicted location in the first data structure can be greater than a weight associated with the predicted address location in the at least one additional data structure (e.g., which includes data entries that are older than the data entries in the first data structure). Thus, the allocation of the more recent data entries in the first data structure can be given a higher priority (weight) than the older data entries and thereby yield a more accurate prediction for the location of the predicted address.

At operation 554, the method 550 includes determining an equivalent address location in a data structure that is equivalent to the predicted address location. For instance, an equivalent address location in a second data structure can be determined that is equivalent to the predicted address location in the first data structure, as described with respect to FIG. 3B.

The equivalent address location, similar to the predicted address location, may be neither the first physical address of the data structure nor the last physical address of the data structure. In some embodiments, the equivalent address location may be neither the first physical address of the data structure, nor the last physical address of the data structure, nor an address location that is substantially equidistant from the first physical location of the data structure and the last physical location of the data structure. Thus, the equivalent address location can be an off-center address location.

In some embodiments, the equivalent address location can be the same distance (quantity of physical address locations) from the first physical address in the second data structure as the predicted address is from the first physical address in the first data structure. Similarly, the equivalent address location can be the same distance (a quantity of physical addresses) from the last physical address in the second data structure as the predicted address is from the last physical address in the first data structure. The equivalent address location can be the same distance from the center physical address in the second data structure as the predicted address is from the center physical address in the first data structure. For instance, in some embodiments, the equivalent address location can be the same distance (quantity of physical address locations) from the first physical address, the last physical address, and the center physical address in the second data structure as the predicted address is from the first physical address, the last physical address, and the center physical address, respectively, in the first data structure.

At operation 556, the method 550 includes writing the data entry to the equivalent address location in a data structure (e.g., the data structure 232 illustrated in FIG. 2 and/or the predictive center allocation data structure 332 illustrated in FIGS. 3B-3C, herein), a first data entry at a physical location that is neither a lowermost physical location (e.g., the first physical address) of a memory resource (e.g., the memory resource 216/316/416 illustrated in FIGS. 2, 3A-3C, and 4, herein) nor an uppermost physical location (e.g., the last physical address) of the memory resource, nor a center physical address location. As discussed above, writing the first data entry to the address location that is neither the lowermost physical location of the memory resource nor the uppermost physical location of the memory resource, nor the center address location of the memory resource can include writing the first data entry to an address location in the memory resource that is an off-center address location.

FIG. 6 is a block diagram of an example computer system in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the predictive center allocation circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to predictive center allocation circuitry (e.g., the center allocation circuitry 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:

a memory resource configured to store data entries in data structures including a first data structure and a second data structure, wherein the data entries stored in the first data structure are different from the data entries stored in the second data structure; and a processing device coupled to the memory resource, wherein the processing device is configured to:

determine a predicted address location in the first data structure for a data entry based on a value of the data entry relative to values of previously written data entries;

determine an equivalent address location in the second data structure that is a distance from a last physical address in the second data structure equivalent to a distance the predicted address location is from a last physical address in the first data structure; and write the data entry to the equivalent address location in the second data structure.

2. The apparatus of claim 1, wherein the data entry further comprises a first data entry for the second data structure.

3. The apparatus of claim 1, wherein the predicted address location is an address location other than an address location in the first data structure that is substantially equidistant from a first physical address of the first data structure and a last physical address location of the first data structure.

4. The apparatus of claim 1, wherein the first data structure is a full data structure.

5. The apparatus of claim 1, wherein:

the first data structure is configured as an ordered ascending data structure or is configured as an ordered descending data structure; and the second data structure is configured as an ordered ascending data structure or is configured as an ordered descending data structure.

6. The apparatus of claim 1, wherein the equivalent physical address location is a physical location in the second data structure that is equivalent to the predicted physical address in the first data structure.

7. The apparatus of claim 1, wherein the first data structure is a data structure included in a plurality of data structures that is directly preceding the second data structure.

8. The apparatus of claim 1, wherein:

the first data structure comprises N address locations, and a first physical address is a zeroth address location of the first data structure and a last address location is an $N^{th}$ address location of the first data structure, or the first physical address is the $N^{th}$ address location of the first data structure and the last address location is the zeroth address location of the first data structure; and the second data structure comprises N address locations, and a first physical address is a zeroth address location of the second data structure and a last address location is an $N^{th}$ address location of the second data structure, or the first physical address is the $N^{th}$ address location of the second data structure and the last address location is the zeroth address location of the second data structure, and wherein a quantity of the N physical address locations in the first data structure is equal to a quantity of the N physical address locations in the second data structure.

9. The apparatus of claim 1, wherein the data entries comprise logical-to-physical mapping entries associated with a memory sub-system in which the memory resources are deployed.

10. The apparatus of claim 1, wherein the predicted address location in the first data structure is altered based on a quantity, a direction, or both, of shift operations involving a first data entry written to the first data structure.

11. A method, comprising:

determining, for a data entry, a predicted physical address location in a first data structure based on a value of the data entry relative to values of previously written data entries, wherein the data entry is stored in a location different than the first data structure;

determining an equivalent physical address location in a second data structure that is a distance from a last physical address in the second data structure equivalent to a distance the predicted physical address location is from a last physical address in the first data structure; and writing a first data entry to the equivalent physical address location in the second data structure.

12. The method of claim 11, wherein the equivalent physical address location further comprises an address location in the second data structure other than an address location that is substantially equidistant from a lowermost physical location of the second data structure and an uppermost physical location of the second data structure.

13. The method of claim 11, further comprising determining the predicted address location based on a predicted location in the first data structure and a predicted address location in at least one additional data structure.

14. The method of claim 13, wherein the first data structure is an immediately preceding data structure that was most recently filled, and wherein a weight associated with the predicted location in the first data structure is greater than a weight associated with the predicted address location in the at least one additional data structure.

15. The method of claim 14, wherein the predicted address location is a location between the predicted location in the first data structure and the predicted location in at least one additional data structure.

16. A non-transitory computer-readable storage medium comprising instructions that, when executed by a processing device, cause the processing device to:

determine, for a first data entry, a predicted address location in a first data structure that is at an off-center physical address in the first data structure based on a value of the first data entry relative to values of previously written data entries, wherein the first data structure is a full data structure storing data entries other than the first data entry;

determine an equivalent address location in a second data structure that is a distance from a last physical address in the second data structure equivalent to a distance the predicted address location is from a last physical address in the first data structure; and write a first data entry to the equivalent address location in the second data structure.

17. The non-transitory computer-readable storage medium of claim 16, wherein the predicted address location in the first data structure is at the off-center physical address that is not the first physical address, the last physical address, nor the center physical address in the first data structure.

18. The non-transitory computer-readable storage medium of claim 17, wherein the equivalent address location in the second data structure is at the off-center physical address that is not the first physical address, the last physical address, nor the center physical address in the second data structure.

19. The non-transitory computer-readable storage medium of claim 17, further comprising instructions that, when executed by the processing device, cause the processing device to write the first data entry, a second data entry, or one or more subsequent data entries, or any combination thereof, to the second data structure as part of an operation to write logical-physical mapping information associated with a memory sub-system in which a memory resource including the second data structure is deployed.

20. The non-transitory computer-readable storage medium of claim 17, further comprising instructions that, when executed by the processing device, cause the processing device to:

receive a command to locate a particular data entry that has been written to the second data structure, wherein the particular data entry is one of the first data entry, a second data entry, or a subsequently written data entry written to the second data structure; and perform a search involving each data entry that has been written to the second data structure to locate the particular data entry.

* * * * *